(12) United States Patent
Marlhe et al.

(10) Patent No.: US 7,419,227 B2
(45) Date of Patent: Sep. 2, 2008

(54) BRAKING DEVICE FOR A MOTOR VEHICLE

(75) Inventors: Nicolas Marlhe, Marly la Ville (FR); Christophe Leboube, Roissy en Brie (FR); Etienne Durand, Paris (FR); Jean-Marc Piel, Livry Gargan (FR)

(73) Assignee: Robert Bosch GmbH, Stuttgart (DE)

( * ) Notice: Subject to any disclaimer, the term of this patent is extended or adjusted under 35 U.S.C. 154(b) by 281 days.

(21) Appl. No.: 11/222,162

(22) Filed: Sep. 8, 2005

(65) Prior Publication Data

US 2006/0049689 A1 Mar. 9, 2006

(30) Foreign Application Priority Data

Sep. 8, 2004 (FR) .................................. 04 09542

(51) Int. Cl.
 *B60T 8/34* (2006.01)
 *B60T 8/44* (2006.01)
(52) U.S. Cl. .................. 303/113.4; 303/114.3; 188/357
(58) Field of Classification Search .................. 303/20, 303/113.4, 114.1, 114.3; 188/355, 356, 357, 188/358, 359, 360
See application file for complete search history.

(56) References Cited

U.S. PATENT DOCUMENTS

| 5,567,021 | A | * | 10/1996 | Gaillard ...................... 188/358 |
| 7,063,393 | B2 | * | 6/2006 | Suzuki et al. .................. 303/3 |
| 7,188,913 | B2 | * | 3/2007 | Yokoyama et al. ........ 303/113.4 |
| 2004/0041466 | A1 | * | 3/2004 | Giers .......................... 303/20 |
| 2005/0231027 | A1 | * | 10/2005 | Giering et al. ............ 303/113.1 |
| 2006/0186729 | A1 | * | 8/2006 | Lehmann et al. .............. 303/11 |
| 2006/0186733 | A1 | * | 8/2006 | Drumm .................... 303/114.1 |

* cited by examiner

*Primary Examiner*—Thomas J Williams
(74) *Attorney, Agent, or Firm*—Leo H McCormick; Sarah Taylor

(57) ABSTRACT

A braking device for a motor vehicle having a first brake circuit (10) with a master cylinder (11) controlled by a brake pedal (12), a second brake circuit (20) with at least one pump (27) that is controlled by a computer (C), and a pedal travel simulation mechanism (40). The simulation mechanism (40) includes a solenoid valve (41) that is mounted in a pipe (42) connected to a hydraulic fluid storage chamber (43) and controlled by the computer (C) so as to allow the brake fluid to flow toward the chamber (43) when the second brake circuit (20) is active and when the driver presses on the brake pedal. The pipe (42) is also connected to another pipe (44) in which hydraulic fluid is displaced by a first part (45) of a control rod connected to the brake pedal (12) and second part (46) associated with the master cylinder (11).

5 Claims, 2 Drawing Sheets

BRAKING DEVICE FOR A MOTOR VEHICLE

BACKGROUND OF THE INVENTION

The invention relates to a braking device for a motor vehicle, comprising a first brake circuit, controlled by the driver of the vehicle, and a second brake circuit controlled by a programmed computer.

The first brake circuit includes a master cylinder controlled in general by a brake pedal, via a pneumatic brake booster, and the second brake circuit includes at least one pump driven by an electric motor and supplied with brake fluid from the master cylinder. The outlet pipes of the master cylinder and of the aforementioned pump are connected to wheel brakes via circuits that include solenoid valves controlled by the computer.

In normal operation, the solenoid valves that connect the outlets of the master cylinder to the wheel brakes are opened by the computer and the wheel brakes are supplied with pressurized brake fluid by the master cylinder of the first brake circuit under the control of the driver when he presses on the brake pedal. During this normal operation, it may happen that a braking command is generated by the computer, which receives setpoint signals from, for example, a software program of the ESP (Electronic Stability Program) or ACC (Active Cruise Control) type.

In this case, the solenoid valves that connect the first brake circuit to the wheel brakes are closed. Because the pressure in the second brake circuit is high, any action by the driver on the brake pedal will result in a very small displacement, one which is very unusual for this pedal and which runs a risk of disturbing and worrying the driver.

Summary of the Invention

The object of the invention is to provide a simple, effective and inexpensive solution to this problem.

It proposes, for this purpose, a braking device for a motor vehicle, comprising a first brake circuit, which includes a master cylinder controlled by a brake pedal, the outlets of said master cylinder being connected to wheel brakes via connection means controlled by a programmed computer, a second brake circuit, which includes at least one pump supplied from the master cylinder in order to supply the wheel brakes under control of the computer, pedal travel simulation means associated with the first brake circuit and allowing displacement of the pedal when the aforementioned connection means are closed by the computer, the travel simulation means comprising a solenoid valve which is mounted in a pipe containing a hydraulic fluid and connected to a hydraulic fluid storage chamber, said solenoid valve being controlled by the computer so as to open in order to allow the hydraulic fluid to flow toward said storage chamber when the brake pedal is actuated by the driver, characterized in that the pipe that includes the solenoid valve is connected to another pipe in which hydraulic fluid is displaced by a part of a control rod provided between the brake pedal and another part of the control rod associated with the master cylinder or with a pneumatic brake booster.

In the braking device according to the invention, the travel simulator may be operated in a simple and reliable manner using inexpensive means each time that the second brake circuit is activated. If the driver then presses on the brake pedal, he then experiences approximately the same sensations as in the case in which the first brake circuit is actuated, and he is therefore not disturbed.

According to another feature of the invention, the hydraulic fluid storage chamber contains a piston urged by a return spring in the direction in which the hydraulic fluid is pushed out of the chamber.

In an alternative embodiment, the pipe that includes the solenoid valve may be mounted in parallel on a chamber that contains hydraulic fluid and a piston that can move in this chamber by a control rod associated with the brake pedal.

In this case, the aforementioned piston is urged into said chamber by a return spring in a direction opposite to the direction of displacement of the piston by the control rod should the brake pedal be applied.

In another alternative embodiment, the control rod associated with the brake pedal is of the telescopic type and comprises two rod parts, one of which can slide in the other, the travel simulation means being located at the junction between the two rod parts.

A first rod part is associated with the brake pedal and is sealingly mounted so as to slide in an axial chamber formed in the other rod part and filled with hydraulic fluid, this chamber communicating via a pipe which includes the aforementioned solenoid valve, with another chamber containing a piston urged by a return spring in a direction tending to push the hydraulic fluid out of this other chamber.

Advantageously, the two chambers mentioned above and the pipe that includes the solenoid valve are housed in the second control rod part.

In all these embodiments, the aforementioned solenoid valve is controlled in an on/off manner by the computer.

The invention will be better understood and other features, details and advantages thereof will become more clearly apparent on reading the following description, given by way of example and with reference to the appended drawings.

DETAILED DESCRIPTION OF THE INVENTION

Figure 1:
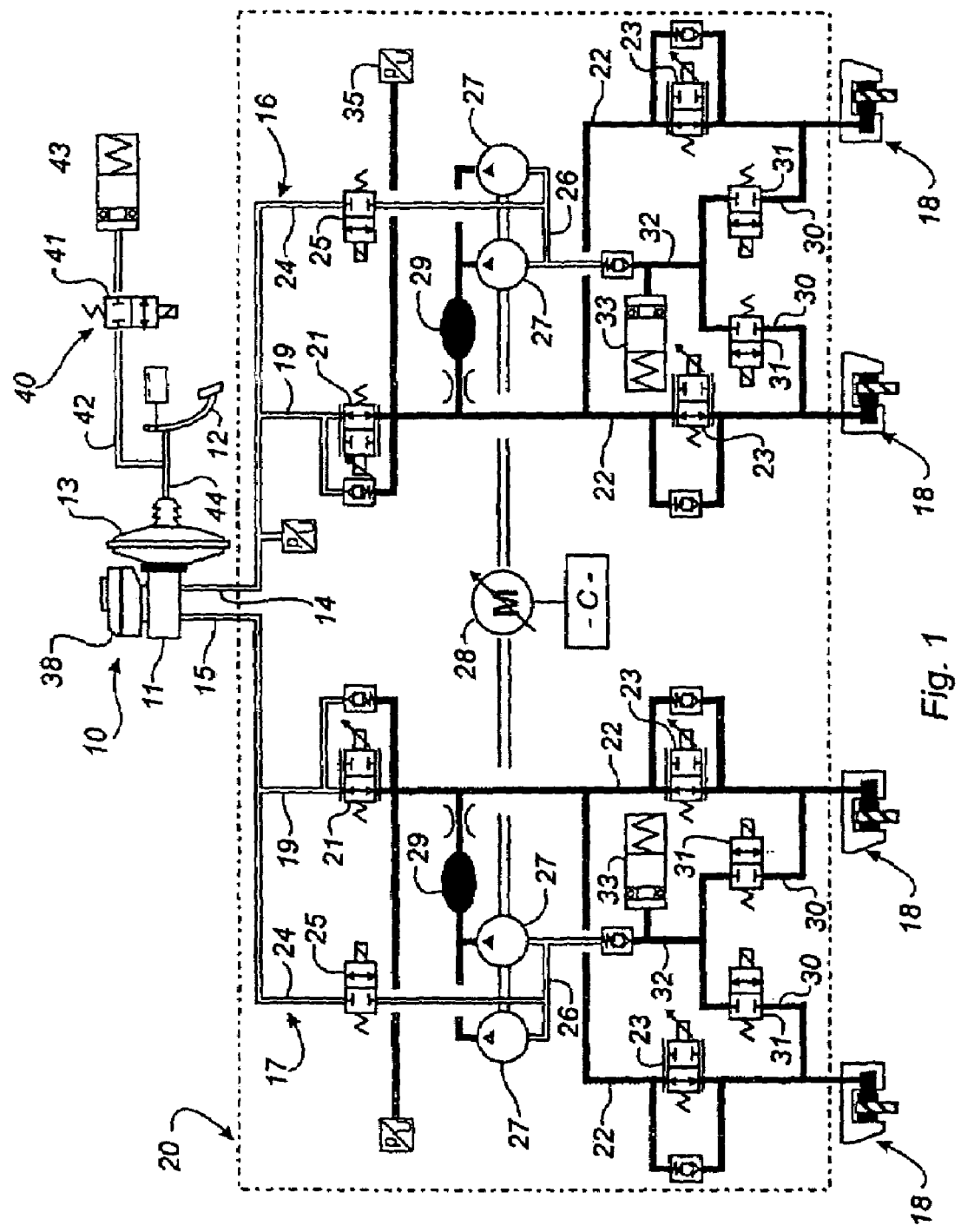
FIG. 1 shows schematically a braking device according to the invention.
Figure 2:
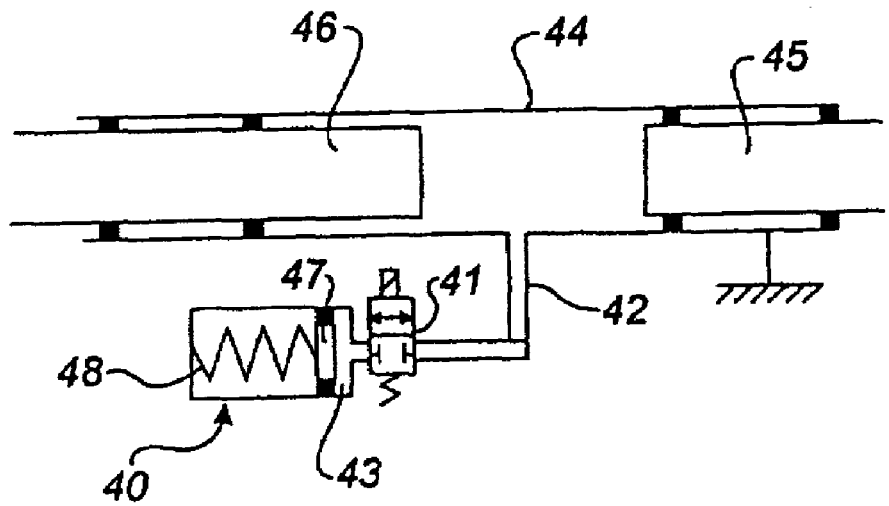
FIG. 2 is a schematic view on a larger scale of part of the device of FIG. 1 and shows the connection of a pedal travel simulator to a pipe that contains a hydraulic fluid.

Referring firstly to FIGS. 1 and 2, these show schematically a first embodiment of a braking device according to the invention.

This braking device comprises a first brake circuit 10 controlled by the driver of the vehicle and a second brake circuit 20 of the electrohydraulic type, which second brake circuit is controlled by a programmed computer C and the electrical connections of which, for connection to various elements of the braking device, have not been shown in order to simplify the drawing and to make it easier to understand.

The first brake circuit 10 includes a master cylinder 11, such as a tandem master cylinder, controlled from a brake pedal 12 actuated by the driver of the vehicle, the brake pedal 12 being connected via a control rod to a brake booster 13 in a manner known to those skilled in the art.

The tandem master cylinder 11 comprises a primary chamber and a secondary chamber, the outlets 14, 15 of which are connected via circuits 16, 17 to brakes 18 with which the wheels of the vehicle are equipped.

The two circuits 16, 17 are identical, one being used to supply the front wheel brakes and the other the rear wheel brakes.

Each circuit 16, 17 includes a pipe 19 fitted with a shutoff solenoid valve 21 controlled by the computer C and connected via its upstream end to an outlet pipe 14, 15 of the master cylinder 11 and via its downstream end to two pipes 22 that lead to the wheel brakes 18, each pipe 22 including a solenoid valve 23 controlled in open/closed mode by the computer C.

Each circuit 16, 17 includes another pipe 24 equipped with a solenoid valve 25 controlled by the computer C, the upstream end of this pipe 24 being connected to an outlet pipe 14, 15 of the master cylinder and its downstream end to a pipe 26 for supplying the pumps 27 which are rotated, for example by the same electric motor 28, and the outlets of which are connected to the inlet of a pressure accumulator 29, the outlet of which is connected to the aforementioned pipe 19 for supplying the two corresponding wheel brakes 18.

After a braking operation, the brake fluid is returned to the master cylinder via pipes 30 which are connected to the wheel brake supply pipes 22 near said pipes and are equipped with solenoid valves 31 controlled by the computer C, these pipes 30 being joined by a common pipe 32 to the pipe 26 for supplying the pumps 27.

A pressure accumulator 33 forming a damper is connected to the aforementioned pipe 32.

Nonreturn valves are mounted in a manner well known to those skilled in the art in parallel on the aforementioned solenoid valves 21 and 23. A nonreturn valve is also mounted in the connection from the pipe 32 to the abovementioned pipe 26 for supplying the pumps 27.

A pressure sensor 35 is connected to the pipe 19 on the downstream side of the shutoff valve 21 and delivers a fluid pressure signal to the computer C.

This computer, the electric motor 28 and the pumps 27 constitute the second brake circuit 20, which has been delimited by the broken lines in the schematic representation shown in FIG. 1.

In normal operation, the wheel brakes 18 are actuated by the driver when he presses on the brake pedal 12, the solenoid valves 21 being open and the solenoid valves 25 being closed, and the second brake circuit 20 being inactive.

When the second circuit 20 becomes active, at least one wheel brake 18 is actuated by the second circuit 20 under the control of the computer C, which receives setpoint signals from a software program, for example of the ESP or ACC type.

In this operating state, the shutoff solenoid valves 21 are closed and the first brake circuit 10 is isolated from the wheel brakes 18. The solenoid valves 25 with which the pipes 24 are equipped are open and the pumps 27 are supplied with brake fluid withdrawn from a reservoir 38 mounted on the master cylinder 11.

When the second brake circuit 20 is active, the driver of the vehicle, when he exerts pressure on the brake pedal 12, cannot move it beyond the take-up of the dead travel because the solenoid valves 21 are closed and because of the pressure in the circuits for supplying the wheel brakes 18.

In order for the driver not to be disturbed by this unusual sensation, a pedal travel simulator 40 is associated with the first brake circuit 10 and includes, as may be seen better in FIG. 2, a solenoid valve 41 mounted in a pipe 42 filled with hydraulic fluid, one end of the pipe 42 opening into a hydraulic fluid storage chamber 43 and the other end of the pipe 42 being connected to a fixed cylindrical pipe 44 containing hydraulic fluid in a space bounded by two pistons, one of which is formed by the end of a first control rod part 45 connected to the brake pedal 12 and the other of which is formed by the end of a second control rod part 46 associated with a piston of the pneumatic brake booster 13.

The hydraulic fluid contained in the pipes 42 and 44 and in the chamber 43 may be brake fluid or another appropriate fluid.

The storage chamber 43 includes a piston 47 mounted so as to slide in a substantially sealed manner within this chamber and permanently urged by a return spring 48 toward the inlet of this chamber in order to prevent the hydraulic fluid from entering the chamber.

When the solenoid valve 41 is in the closed position shown in FIGS. 1 and 2, the hydraulic fluid contained in the pipes 42 and 44 cannot flow into the chamber 43 and, conversely, the hydraulic fluid contained in the chamber 43 cannot flow out into the pipes 42 and 44.

If the driver then presses on the brake pedal 12, the force is transmitted by the first rod part 45 to the second rod part 46 which, if the solenoid valves 21 are in the open position, will increase the pressure in the circuits for supplying the wheel brakes 18 and will apply these brakes. If the solenoid valves 21 are in the closed position, there is very little or no displacement of the rod parts 45 and 46.

If the solenoid valve 41 is in the open position, any action by the driver on the brake pedal 12 will result in the rod part 45 moving toward the other rod part 46 and in hydraulic fluid entering the chamber 43, entry continuing until the force exerted by the spring 48 on the piston 47 balances the force applied by the hydraulic fluid to this piston.

The sensations experienced by the driver when he presses on the brake pedal 12 are then substantially the same as if the wheel brakes 18 were applied by the first brake circuit 10.

When the solenoid valves 21 are opened by the computer C, for controlled braking of the vehicle by the first circuit 10, the solenoid valve 41 of the travel simulator is closed and the presence of the simulator does not impair the effectiveness of the first brake circuit.

Figure 3:
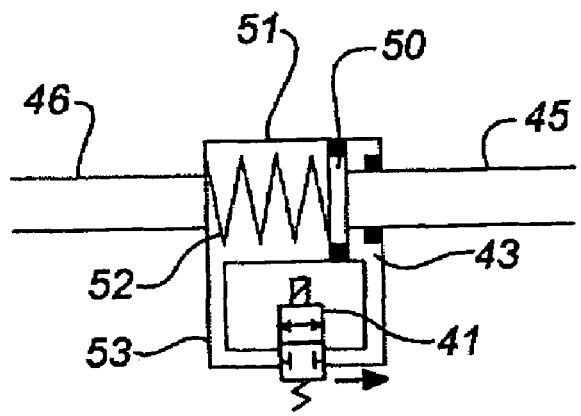
FIGS. 3 and 4 are partial schematic views corresponding to FIG. 2 and show alternative embodiments of the invention.

In the embodiment shown in FIG. 3, that end of the first control rod part 45 which is connected to the brake pedal 12 carries a piston 50 that can undergo translational displacement in a substantially sealed manner in a chamber 51 against the action of a return spring 52 mounted between the piston 50 and that end of the chamber 51 which is located on the opposite side from the first rod part 45. The second rod part 46 extends from the chamber 51 toward the brake booster 13.

The solenoid valve 41 controlled by the computer is mounted in a pipe 53, the ends of which open into the ends of the chamber 51, on either side of the aforementioned piston 50.

In this case, the aforementioned storage chamber 43 is formed by that part of the pipe 53 which connects the solenoid valve 41 to that part of the chamber 51 into which the first part 45 of the control rod enters, and by that part of the chamber 51 lying between the piston 50 and the flow orifice of the rod part 45.

Thus, when the solenoid valve 41 is in the closed position as shown, any force exerted by the driver on the brake pedal 12 is transmitted from the first part 45 to the second part 46 of the control rod. When the solenoid valve 41 is in the open position and the second part 46 of the control rod is substantially immobilized positionally owing to the fact that the solenoid valves 21 are closed, the action by the driver on the pedal 12 results in displacement of the piston 50 toward the second rod part 46 and in compression of the spring 52, the fluid flowing into the circuit 53 from one end of the chamber 51 to the other, in the direction indicated by the arrow.

The sensations experienced by the driver then correspond to those of normal braking.

Figure 4:
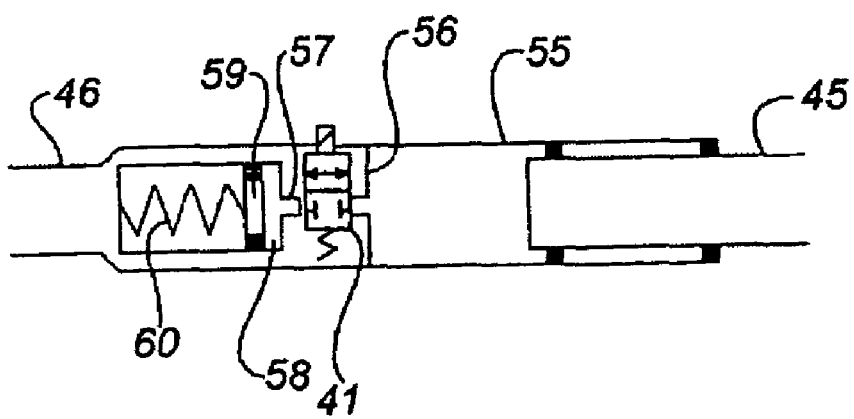

In the embodiment shown in FIG. 4, the control rod connecting the brake pedal 12 to the brake booster 13 includes a first rod part 45 connected to the brake pedal 12 and axially mounted so as to slide in a sealed manner in the flared end of the second part 46 of the control rod. A hydraulic fluid, for example brake fluid, fills the chamber 55, which is bounded in the flared end portion of the second part 46 of the control rod by the end of the first part 45 of the rod and by a transverse wall 56 that includes a duct 57 equipped with a solenoid valve 41. This duct 57 opens into another chamber 58 housed inside the flared end portion of the second part 46 of the control rod.

The chamber 58 includes, like the chamber 43 of FIG. 2, a piston 59 mounted so as to slide in a sealed manner in the chamber and permanently urged by a return spring 60 toward the inlet of this chamber.

When the solenoid valve 41 is in the closed position as shown, any force exerted by the driver on the brake pedal 12 is transmitted, entirely by the first part 45 of the control rod and the fluid filling the chamber 55, to the second part 46 of the control rod.

When the solenoid valve 41 is open and the second part 46 of the control rod is substantially blocked, because the aforementioned solenoid valves 21 are closed, action by the driver on the brake pedal 12 results in displacement of the first part 45 of the control rod toward the second part 46 of this rod, in entry of fluid into the chamber 58 and in corresponding displacement of the piston 59 and compression of the return spring 60.

The sensations experienced by the driver are then substantially those of normal braking.

The solenoid valves 41 of the embodiments shown in FIGS. 1 to 4 are controlled in on/off mode by the computer C and are therefore either in the open position or in the closed position.

What is claimed is:

1. A braking device for a motor vehicle, comprising a first brake circuit (10), which includes a master cylinder (11) controlled by a brake pedal (12), a first outlet (14) and a second outlet (15) of said master cylinder being connected to wheel brakes (18) via connection means (21, 23, 25) controlled by a programmed computer (C), a second brake circuit (20), which includes at least one pump (27) supplied from the master cylinder (11) in order to supply the wheel brakes (18) under control of the computer (C), and pedal travel simulation means (40) associated with said first brake circuit (10) and allowing displacement of the pedal (12) when said connection means (21) are closed, said pedal travel simulation means (40) comprising a solenoid valve (41) which is mounted in a pipe (42) that contains a hydraulic fluid and is connected to a hydraulic fluid storage chamber (43), said solenoid valve (41) being controlled by the computer (C) and is connected to another pipe (44) in which hydraulic fluid is displaced in a first direction by a first part (45) of a control rod provided between the brake pedal (12) and a second part (46) of the control rod associated with the master cylinder (11) or with a pneumatic brake booster, said storage chamber (43) contains a first piston (47, 50, 59) that is urged by a return spring (48, 52, 60) in a second direction in which the hydraulic fluid is pushed out of said storage chamber (43), said pipe (42) that includes said solenoid valve (41) controlling hydraulic fluid such that said return spring (48, 52, 60) urges hydraulic fluid from said storage chamber (43) and combined with hydraulic fluid displaced by said first part (45) to effect a brake application.

2. The device according to claim 1, characterized in that the control rod associated with the brake pedal (12) comprises said first part (45) and said second part (46) one of which slides relative to the other, and in that the travel simulation means (40) are located at a junction between said first part (45) and said second part (46).

3. The device according to claim 2, characterized in that said part (45) associated with the brake pedal (12)is sealingly mounted to slide in a first axial chamber (55) formed in said second part (46) that is filled with hydraulic fluid, said first axial chamber (55) communicating via a pipe (57) which includes said solenoid valve (41), with a second axial chamber (58) containing said piston (59) urged by said return spring (60) in a direction that pushes hydraulic fluid out of said second axial chamber (58).

4. The device according to claim 3, characterized in that said first axial chamber (55) and said second axial chamber (58) and said pipe (57) that includes said solenoid valve (41) are housed in said second part (46).

5. The device according to claim 1, characterized in that said solenoid valve (41) is controlled in an on/off manner by the computer (C).

* * * * *